United States Patent
Ogihara et al.

(10) Patent No.: US 12,510,875 B2
(45) Date of Patent: Dec. 30, 2025

(54) INFORMATION PROCESSING APPARATUS AND METHOD TO DECIDE INSPECTION METHOD FOR MANUFACTURED PRODUCT, AND NON-TRANSITORY COMPUTER READABLE MEDIUM STORING PROGRAM

(71) Applicant: FUJIFILM Business Innovation Corp., Tokyo (JP)

(72) Inventors: Atsushi Ogihara, Kanagawa (JP); Tomonari Takahashi, Kanagawa (JP); Ryosuke Higashikata, Kanagawa (JP); Yasuyuki Tanaka, Kanagawa (JP); Yasushi Uemura, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 504 days.

(21) Appl. No.: 17/894,400

(22) Filed: Aug. 24, 2022

(65) Prior Publication Data
US 2023/0305518 A1 Sep. 28, 2023

(30) Foreign Application Priority Data
Mar. 24, 2022 (JP) .................. 2022-048235

(51) Int. Cl.
*G05B 19/4063* (2006.01)
*H04N 5/222* (2006.01)

(52) U.S. Cl.
CPC .......... *G05B 19/4063* (2013.01); *G05B 2219/50185* (2013.01); *H04N 5/2226* (2013.01)

(58) Field of Classification Search
None
See application file for complete search history.

(56) References Cited

U.S. PATENT DOCUMENTS

| | | | |
|---|---|---|---|
| 2015/0276704 A1* | 10/2015 | Numauchi | G06T 19/20 702/182 |
| 2018/0293597 A1* | 10/2018 | Koese | G06Q 10/20 |
| 2020/0096979 A1* | 3/2020 | Hatakeyama | G05B 19/41875 |
| 2020/0406358 A1* | 12/2020 | Nagahama | B22F 10/28 |
| 2022/0019180 A1* | 1/2022 | Samejima | G05B 13/0265 |

FOREIGN PATENT DOCUMENTS

| | | |
|---|---|---|
| JP | 2021-26360 A | 2/2021 |
| JP | 2021-085704 A | 6/2021 |

OTHER PUBLICATIONS

[Online];"Inspection table system;" ANDOR Co., Ltd. Product Catalog; Accessed on Dec. 10, 2021; <URL:https://www.andor.co.jp/products/inspection/index.html>.
Sep. 30, 2025 Office Action issued in Japanese Patent Application No. 2022-048235.

* cited by examiner

*Primary Examiner* — Haris Sabah
(74) *Attorney, Agent, or Firm* — Oliff PLC

(57) ABSTRACT

An information processing apparatus includes a processor configured to: extract, as an inspection target item, product manufacturing information needed for inspection from three-dimensional model data including the product manufacturing information needed when a molded product is manufactured; and decide an inspection method to be used for inspection as to the product manufacturing information as the inspection target item according to information related to the extracted product manufacturing information.

11 Claims, 24 Drawing Sheets

FIG. 3

| INSPECTION NUMBER | NOTE | REFERENCE DIMENSION | TOLERANCE UPPER LIMIT | TOLERANCE LOWER LIMIT | INSPECTION RESULT | | | INSPECTION METHOD |
|---|---|---|---|---|---|---|---|---|
| | | | | | SAMPLE 1 | SAMPLE 2 | SAMPLE 3 | |
| 1 | φ | 3 | 0.014 | 0 | | | | PG |
| 2 | PERPENDICULARITY φ | 0 | 0.1 | 0 | | | | CMM |
| 3 | φ | 2.6 | 0.1 | -0.1 | | | | PG |
| 4 | POSITION φ | 0 | 0.1 | 0 | | | | CMM |
| 5 | φ | 2.6 | 0.1 | -0.1 | | | | PG |
| 6 | POSITION φ | 0 | 0.1 | 0 | | | | CMM |
| 7 | | 120 | 0.5 | -0.5 | | | | DC |
| ... | ... | ... | ... | ... | | | | ... |

FIG. 4

| ABBREVIATED NAME FOR INSPECTION METHOD | OFFICIAL NAME |
|---|---|
| CMM | THREE-DIMENSIONAL MEASURING MACHINE |
| OC | VISION MEASURING SYSTEM |
| HG | HEIGHT GAUGE |
| MIC | MICROMETER |
| DC | CALIPER |
| CG | CHECKING GAUGE |
| PRO | PROFILE PROJECTOR |
| BG | BLOCK GAUGE |
| TG | THICKNESS GAUGE |
| SG | SCREW GAUGE |
| PG | PIN GAUGE |
| LSM | LASER SCAN MACHINE |
| OTH | OTHERS |

FIG. 10

| Type Inspection Standard | | Datum Reference | Shape | Reference Dimension | Tolerance | Inspection Method |
|---|---|---|---|---|---|---|
| SIZE TOLERANCE | LENGTH DIMENSION | TANGENT POINT AND INTERSECTION POINT NOT INCLUDED | ALL | ALL | ALL | CMM, PRO |
| | | HOLE | NORMAL LINES ARE OPPOSED | 50 mm OR LESS | LESS THAN 0.2 | BG (PG, WHEN BG IS NOT INCLUDED. DC, WHEN PG IS NOT INCLUDED) |
| | | HOLE | NORMAL LINES ARE OPPOSED | 50 mm OR LESS | 0.2 OR GREATER AND LESS THAN 0.3 | CMM |
| | | HOLE | NORMAL LINES ARE OPPOSED | GREATER THAN 50 mm | 0.3 OR GREATER | DC (CMM, WHEN GEOMETRIC TOLERANCE IS ALSO MEASURED) |
| | | OUTSIDE | NORMAL LINES OF SURFACES ARE OUTWARD, AND SURFACES ARE OVERLAPPED IN NORMAL LINE DIRECTION (1) | 100 mm OR LESS | LESS THAN 0.2 | BG (PG, WHEN BG IS NOT INCLUDED. DC, WHEN PG IS NOT INCLUDED) |
| | | OUTSIDE | NORMAL LINES OF SURFACES ARE OUTWARD, AND SURFACES ARE OVERLAPPED IN NORMAL LINE DIRECTION (1) | 100 mm OR LESS | 0.2 OR GREATER | CMM |
| | | OUTSIDE | NORMAL LINES OF SURFACES ARE OUTWARD, AND SURFACES ARE OVERLAPPED IN NORMAL LINE DIRECTION (1) | GREATER THAN 100 mm | LESS THAN 0.3 | MIC |
| | | OUTSIDE | NORMAL LINES OF SURFACES ARE OUTWARD, AND SURFACES ARE OVERLAPPED IN NORMAL LINE DIRECTION (1) | GREATER THAN 100 mm | 0.3 OR GREATER | DC (CMM, WHEN GEOMETRIC TOLERANCE IS ALSO MEASURED) |
| | | OUTSIDE | NORMAL LINES OF SURFACES ARE OUTWARD, AND SURFACES ARE NOT OVERLAPPED IN NORMAL LINE DIRECTION (2) | ALL | ALL | CMM |
| | | OUTSIDE | NORMAL LINES OF SURFACES ARE PARALLEL, AND EDGES ARE OVERLAPPED IN NORMAL LINE DIRECTION (3) | ALL | ALL | CMM |
| | | OUTSIDE | NORMAL LINES OF SURFACES ARE PARALLEL, AND EDGES ARE NOT OVERLAPPED IN NORMAL LINE DIRECTION (4) | ALL | ALL | DC |
| | LOCAL DIMENSION | INTERSECTION POINT | ALL | ALL | ALL | CMM |
| | LOCAL DIMENSION | INTERSECTION POINT | ALL | ALL | ALL | CMM, PRO |
| | LOCAL DIMENSION | TANGENT POINT | ALL | ALL | ALL | BLANK COLUMN (DEPENDING ON SHAPE, DATUM) |

FIG. 11

| Category | Item | Shape | Size | Sub-size | Method |
|---|---|---|---|---|---|
| SIZE TOLERANCE | DIAMETER DIMENSION | CIRCLE/ARC (EXCEEDING SEMICIRCLE) HOLE | 30 mm OR LESS | LESS THAN 0.3 | PG, MIC |
| | | CIRCLE/ARC (EXCEEDING SEMICIRCLE) HOLE | GREATER THAN 30 mm | 0.3 OR GREATER | DC (CMM: WHEN GEOMETRIC TOLERANCE IS ALSO MEASURED) |
| | | CIRCLE/ARC (EXCEEDING SEMICIRCLE) HOLE | | ALL | CMM |
| | | CIRCLE/ARC (EXCEEDING SEMICIRCLE) OUTSIDE | 100 mm OR LESS | LESS THAN 0.3 | MIC |
| | | CIRCLE/ARC (EXCEEDING SEMICIRCLE) OUTSIDE | GREATER THAN 100 mm | 0.3 OR GREATER | DC (CMM: WHEN GEOMETRIC TOLERANCE IS ALSO MEASURED) |
| | | CIRCLE/ARC (EXCEEDING SEMICIRCLE) OUTSIDE | | ALL | CMM |
| | | ARC (UP TO SEMICIRCLE) | ALL | ALL | CMM, PRO |
| | ANGLE DIMENSION | ALL | ALL | ALL | CMM |
| | CHAMFERING | ALL | ALL | ALL | OC |
| | SCREW | ALL | ALL | ALL | SG |
| GEOMETRIC TOLERANCE | STRAIGHTNESS | ALL | ALL | ALL | BLANK COLUMN (DEPENDING ON SHAPE, DATUM) |
| | FLATNESS | ALL | ALL | ALL | BLANK COLUMN (DEPENDING ON SHAPE, DATUM) |
| | PROFILE (OF LINE) | ALL | ALL | ALL | CMM, PRO |
| | PROFILE (OF SURFACE) | ALL | ALL | ALL | CMM, PRO |
| | ... | ... | ... | ... | ... |

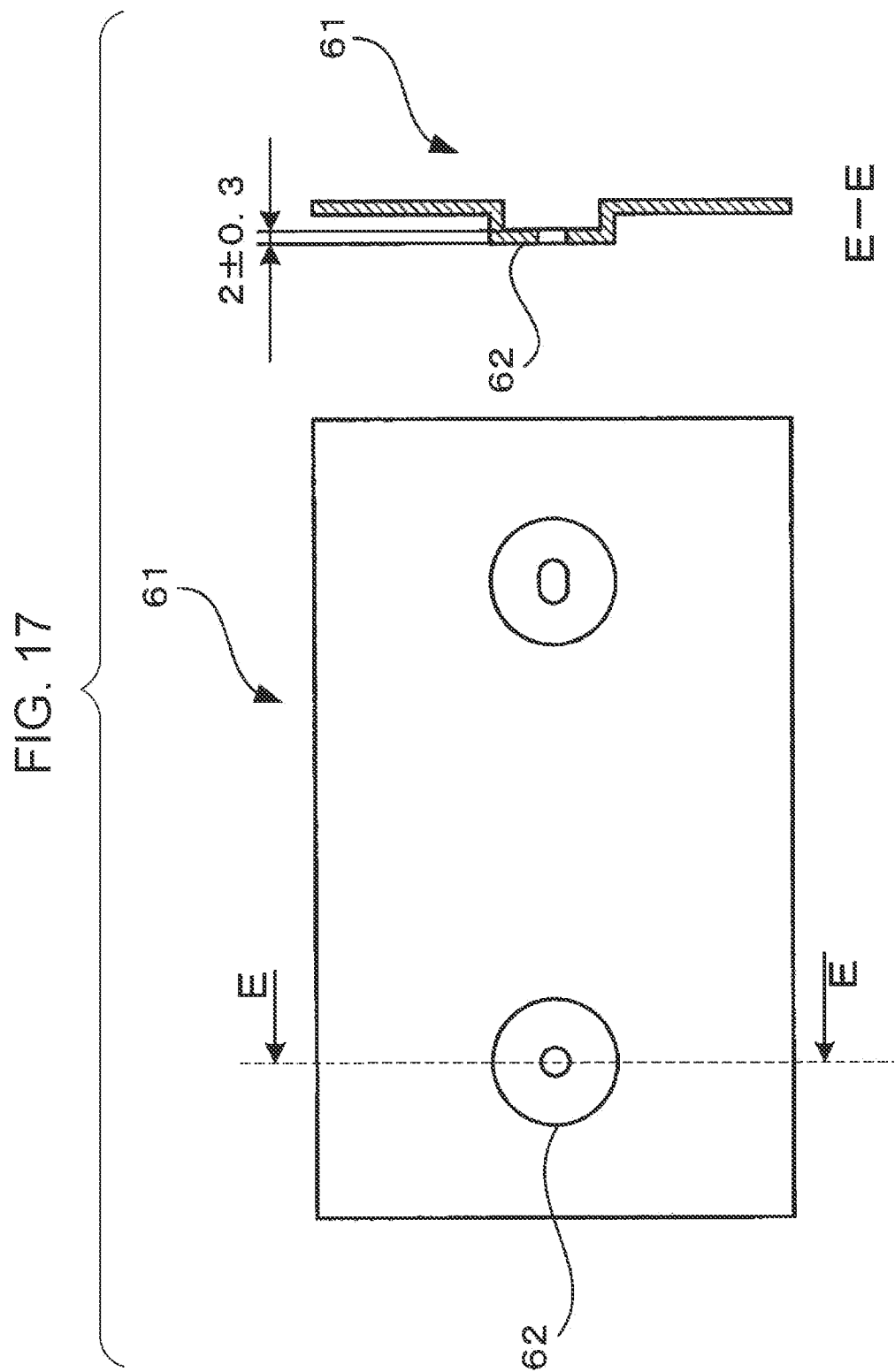

FIG. 18

| TYPE OF INSPECTION STANDARD | | SHAPE | PROCESSING METHOD | SETTING OF MEASUREMENT POINTS AND NUMBER OF MEASUREMENT POINTS |
|---|---|---|---|---|
| SIZE TOLERANCE | LENGTH DIMENSION | DATUM REFERENCE | ALL | INJECTION MOLDING | DRAFT ANGLE PROHIBITED | AT LEAST TWO POINTS AT (ROOT END/TIP END) IN DRAFT DIRECTION<br>MULTIPLY MEASUREMENT POINTS BY M ACCORDING TO LENGTH PERPENDICULAR TO DRAFT DIRECTION/LENGTH DIMENSION<br>PERPENDICULAR LENGTH OF 30 mm OR LESS: M=1  LENGTH EXCEEDING 30 mm and 100 mm OR LESS: M=2<br>LENGTH EXCEEDING 100 mm and 300 mm OR LESS: M=3  SUBSEQUENTLY, EACH TIME LENGTH IS INCREASED BY 200 mm, M=M+1<br>WHEN DRAFT DIRECTION AND LENGTH DIMENSION DIRECTION ARE THE SAME, NO EXPANSION IS MADE IN DRAFT DIRECTION,<br>BUT EXPANSION IS MADE IN TWO PERPENDICULAR DIRECTIONS BY ABOVE-MENTIONED DETERMINATION<br>WHEN POSITION IS ALSO INCLUDED, EXPANSION IS ALSO MADE FOR POSITION CONCURRENTLY |
| | | | | | DRAFT ANGLE IS PREDETERMINED ANGLE OR LESS | MULTIPLY MEASUREMENT POINTS BY M ACCORDING TO LENGTH PERPENDICULAR TO DRAFT DIRECTION/LENGTH DIMENSION<br>PERPENDICULAR LENGTH OF 30 mm OR LESS: M=1  LENGTH EXCEEDING 30 mm and 100 mm OR LESS: M=2<br>LENGTH EXCEEDING 100 mm and 300 mm OR LESS: M=3<br>SUBSEQUENTLY, EACH TIME LENGTH IS INCREASED BY 200 mm, M=M+1<br>WHEN CIRCLE IS TO BE MEASURED, EXPANSION IS MADE FOR EVERY 90 DEGREES OF CIRCLE HAVING DIAMETER<br>OF 5 cm OR LONGER, WHEN POSITION IS ALSO INCLUDED, EXPANSION IS ALSO MADE FOR POSITION CONCURRENTLY |
| | | | | PRESS WORKING | BENDING (BENDING HEIGHT EXCEEDS PLATE THICKNESS) | AT LEAST TWO POINTS AT (ROOT END/TIP END) IN BENDING DIRECTION<br>MULTIPLY MEASUREMENT POINTS BY M ACCORDING TO LENGTH PERPENDICULAR TO BENDING DIRECTION/LENGTH DIMENSION<br>PERPENDICULAR LENGTH OF 20 mm OR LESS: M=1  LENGTH EXCEEDING 20 mm and 100 mm OR LESS: M=2<br>LENGTH EXCEEDING 100 mm and 300 mm OR LESS: M=3  SUBSEQUENTLY, EACH TIME LENGTH IS INCREASED BY 200 mm, M=M+1 |
| | | | | | END FACE (HEIGHT IS EQUAL TO PLATE THICKNESS) | MULTIPLY MEASUREMENT POINTS BY M ACCORDING TO LENGTH PERPENDICULAR TO PLATE THICKNESS/LENGTH DIMENSION<br>PERPENDICULAR LENGTH OF 30 mm OR LESS: M=1  LENGTH EXCEEDING 30 mm and 100 mm OR LESS: M=2<br>LENGTH EXCEEDING 100 mm and 300 mm OR LESS: M=3  SUBSEQUENTLY, EACH TIME LENGTH IS INCREASED BY 200 mm, M=M+1 |
| | | LOCAL DIMENSION | ALL | INJECTION MOLDING | DRAFT ANGLE PROHIBITED | AT LEAST TWO POINTS AT (ROOT END/TIP END) IN DRAFT DIRECTION<br>MULTIPLY MEASUREMENT POINTS BY M ACCORDING TO LENGTH PERPENDICULAR TO DRAFT DIRECTION/LENGTH DIMENSION<br>PERPENDICULAR LENGTH OF 30 mm OR LESS: M=1  LENGTH EXCEEDING 30 mm and 100 mm OR LESS: M=2<br>LENGTH EXCEEDING 100 mm and 300 mm OR LESS: M=3  SUBSEQUENTLY, EACH TIME LENGTH IS INCREASED BY 200 mm, M=M+1 |
| | | | | | DRAFT ANGLE IS PREDETERMINED ANGLE OR LESS | ............ |

INFORMATION PROCESSING APPARATUS AND METHOD TO DECIDE INSPECTION METHOD FOR MANUFACTURED PRODUCT, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2022-048235 filed Mar. 24, 2022.

BACKGROUND

(i) Technical Field

The present disclosure relates to an information processing apparatus, a non-transitory computer readable medium storing a program, and an information processing method.

(ii) Related Art

Japanese Unexamined Patent Application Publication No. 2021-026360 discloses a pseudo dimension acquisition apparatus that obtains a dimension value and a tolerance accurately.

The product catalog of ANDOR Co., Ltd. ("inspection table system", [online], [searched on Dec. 10, 2021] on the Internet, "https://www.andor.co.jp/products/inspection/index.html") discloses an inspection table system that automatically generates an inspection table from drawings (DXF/DWG, PDF, images).

SUMMARY

In recent years, in three-dimensional computer-aided design (CAD), not only product shape information indicating the shapes of molded products, but also standard information such as a reference dimension (also referred to as an illustration size) and a tolerance are included in three-dimensional model data as product manufacturing information (hereinafter abbreviated as PMI). In this manner, when a three-dimensional model is displayed, PMI can be displayed as three-dimensional annotation on the three-dimensional model, and information such as necessary reference dimensions and tolerances can be grasped without a two-dimensional drawing.

When it is inspected to see whether a molded product generated by such three-dimensional model data is molded in a proper state, dimensions of each inspection target site of the molded product are measured for PMI which is selected as an inspection target item from pieces of PMI included in the three-dimensional model data.

Note that when dimensions of an inspection target site are measured, various inspection methods may be used, such as measurement with a caliper, measurement with a coordinate measuring machine (CMM), measurement with a pin gauge, and measurement with a block gauge. Thus, an appropriate inspection method needs to be selected for inspection according to required accuracy, and a shape of an inspection target site for PMI of each of target inspection items.

However, a user who is not familiar with inspection method may be unable to select an inspection method for the PMI of each of target inspection items. In addition, there is a problem in that a selected inspection method varies depending on a user who decides an inspection method. Furthermore, there is another problem in that manually deciding an inspection method for each PMI takes time and effort.

Aspects of non-limiting embodiments of the present disclosure relate to providing an information processing apparatus, a non-transitory computer readable medium storing a program, and an information processing method that, upon inspection of a molded product using product manufacturing information included in three-dimensional model data, are capable of automatically deciding an inspection method to be used for each of pieces of product manufacturing information as target inspection items.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: extract, as an inspection target item, product manufacturing information needed for inspection from three-dimensional model data including the product manufacturing information needed when a molded product is manufactured; and decide an inspection method to be used for inspection as to the product manufacturing information as the inspection target item according to information related to the extracted product manufacturing information.

BRIEF DESCRIPTION OF THE DRAWINGS

Exemplary embodiment of the present disclosure will be described in detail based on the following figures, wherein:

FIG. 3 is a table illustrating an example of an inspection table which is generated by extracting inspection standards from three-dimensional model data;

FIG. 4 is a table of abbreviations of inspection devices to be used each shown as an inspection method in the inspection table illustrated in FIG. 3;

FIG. 10 is a table illustrating an example of decision criteria when an inspection method is decided;

FIG. 11 is a table illustrating an example of decision criteria when an inspection method is decided;

FIG. 17 is a drawing illustrating that a size tolerance of 2±0.3 is specified for the plate thickness of a circular recessed portion 62 in the component 61 illustrated in FIG. 16;

FIG. 18 is a table illustrating an example of setting criteria when measurement points and the number of measurement points are set;

DETAILED DESCRIPTION

Next, an exemplary embodiment of the present disclosure will be described in detail with reference to the drawings.

Figure 1:
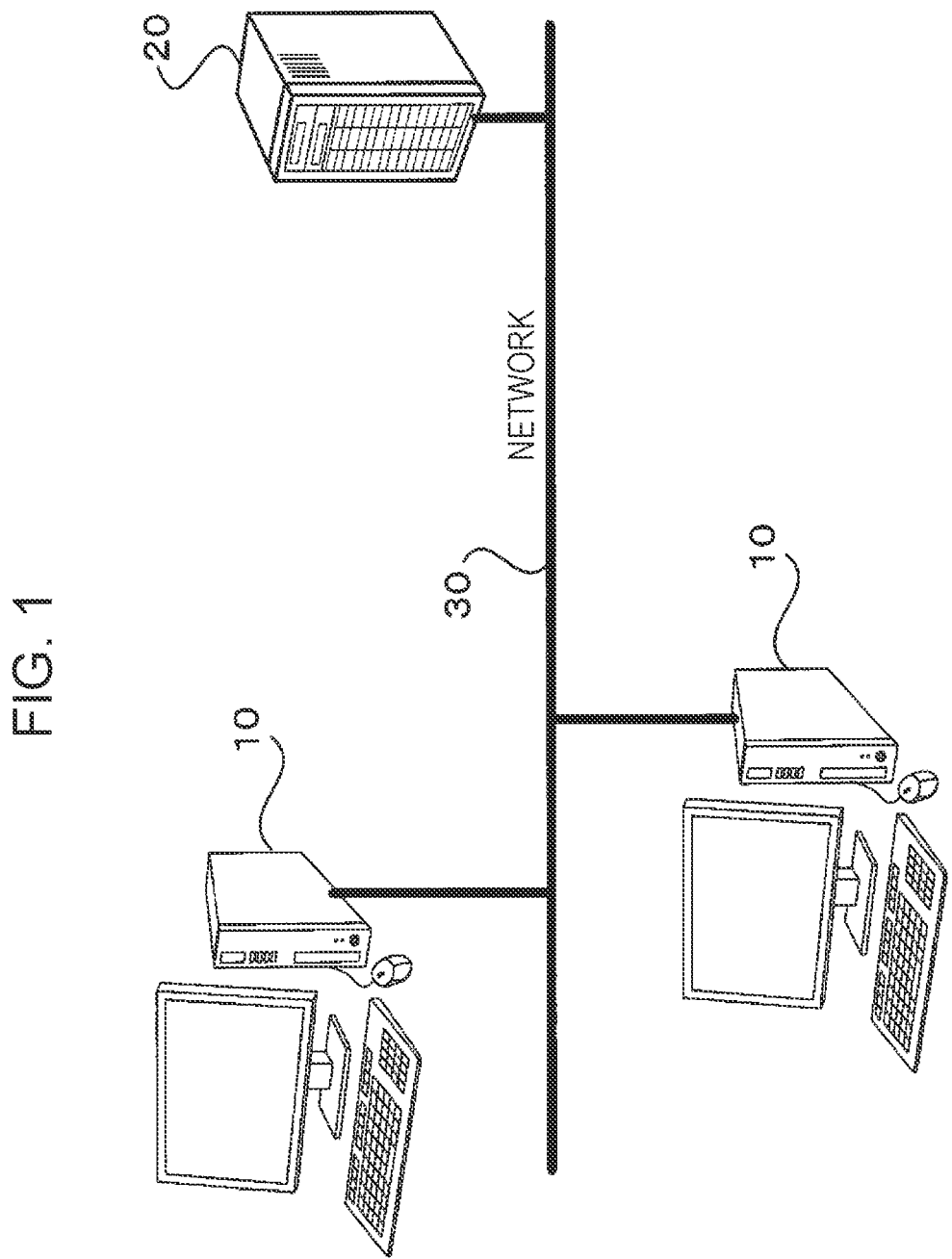
FIG. 1 is a diagram illustrating a system configuration of a drawing data processing system in an exemplary embodiment of the present disclosure.

FIG. 1 is a diagram illustrating a system configuration of a drawing data processing system in an exemplary embodiment of the present disclosure.

As illustrated in FIG. 1, the drawing data processing system of an exemplary embodiment of the present disclosure includes a plurality of terminal apparatuses 10 and a drawing data management server 20 which are coupled to each other by a network 30. The drawing data management server 20 manages drawing data such as a component drawing and a product drawing when various products are designed. The terminal apparatus 10 is an information processing apparatus having functions of downloading and displaying the drawing data managed by the drawing data management server 20, performing various works such as modification and change on the downloaded drawing data, and uploading the drawing data to the drawing data management server 20.

Here, the drawing data managed by the drawing data management server 20 is three-dimensional model data which includes, as the PMI, not only product shape information indicating the shapes of molded products, but also standard information such as reference dimensions and tolerances, for example.

Figure 2:
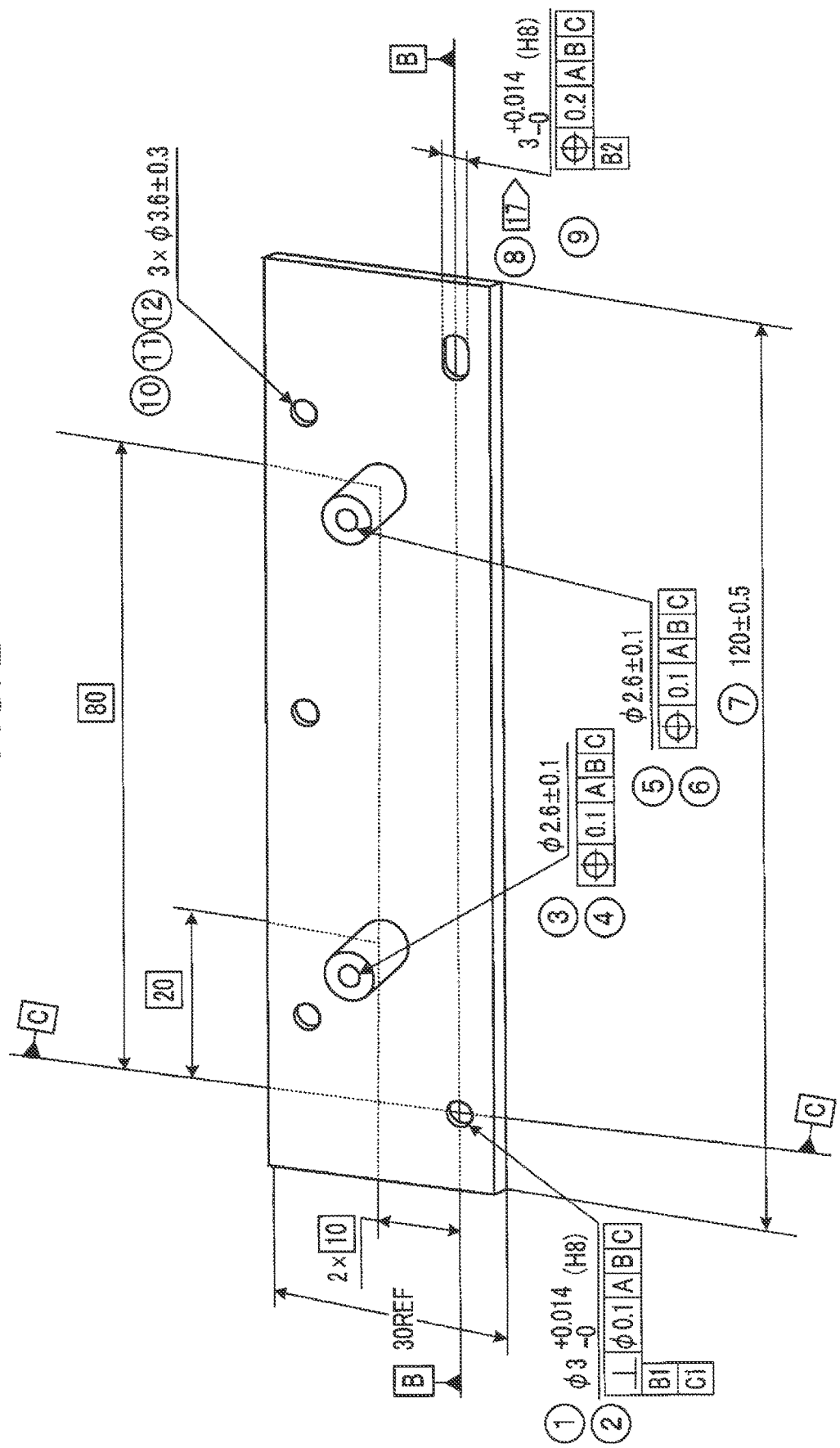
FIG. 2 is a drawing illustrating an example of three-dimensional model data including PMI.

FIG. 2 illustrates an example of three-dimensional model data including such PMI. Referring to FIG. 2, it is seen that various PMI such as a size tolerance, a geometric tolerance, a theoretically exact dimension (hereinafter abbreviated as a theoretical dimension) are displayed on a three-dimensional model as three-dimensional annotation.

When it is inspected to see whether a molded product generated by such three-dimensional model data is molded in a proper state, PMI as an inspection target item is selected from pieces of PMI included in the three-dimensional model data by a user, and a dimension of each inspection target site of the molded product is measured for the PMI selected as the inspection target item.

In recent years, information such as dimensions, and tolerances has been automatically extracted from three-dimensional model data as inspection standards to generate an inspection table.

An example of thus generated inspection table is illustrated in FIG. 3. In the inspection table illustrated in FIG. 3, it is seen that items of inspection number, note, reference dimension, tolerance upper limit, tolerance lower limit, entry columns of inspection result and inspection method are described for each inspection standard extracted from three-dimensional model data.

FIG. 4 illustrates a table of abbreviations of inspection devices to be used each shown as an inspection method in the inspection table illustrated in FIG. 3. CMM shown as an abbreviation in inspection method stands for coordinate measuring machine, and OC refers to vision measuring system. HG stands for height gauge, and MIC stands for micrometer. DC refers to caliper, and CG stands for checking gauge. PRO stands for profile projector, and BG stands for block gauge. TG stands for thickness gauge, and SG stands for screw gauge. In addition, PG stands for pin gauge, and LSM stands for laser scan machine. Note that these abbreviations will also be used in the following description.

In thus automatically generated inspection table, one measurement point is set for an inspection standard defined by one piece of PMI. However, depending on the characteristics of an inspection target site of a molded product, proper inspection may not be made by measurement at only one point. Conversely, if measurement is made at multiple measurement points for dimensions defined in one piece of PMI, a molded product may fail the inspection even through the product is properly molded.

For example, at points where instructions to prohibit draft are given in a drawing, draft is permitted only in a range where the entire dimension in draft direction is within a tolerance, thus it is necessary to measure a dimension at least two points of a tip end and a root end in draft direction. A point where no instructions to prohibit draft are given, specifically, a point where draft is provided within a specified angle in a direction with reduced material is selected as a measurement point where the point has a greatest material among the points where draft is provided, that is, the point has a greatest dimension value. The draft direction changes according to the position of parting line (PL) indicating a position at which a mold is divided. In other words, a measurement point at which a dimension value is to be measured in a drawing changes according to whether instructions to prohibit draft are given and where the position of PL is located.

Figure 5A:
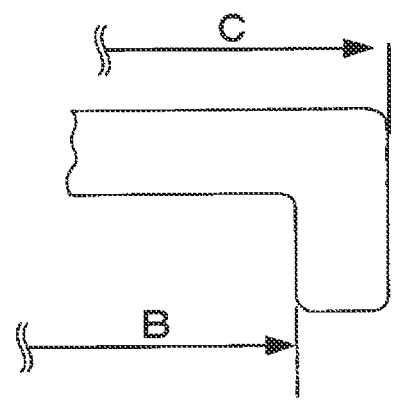
FIG. 5A is a drawing indicating an illustrated example in a three-dimensional model.
Figure 5B:
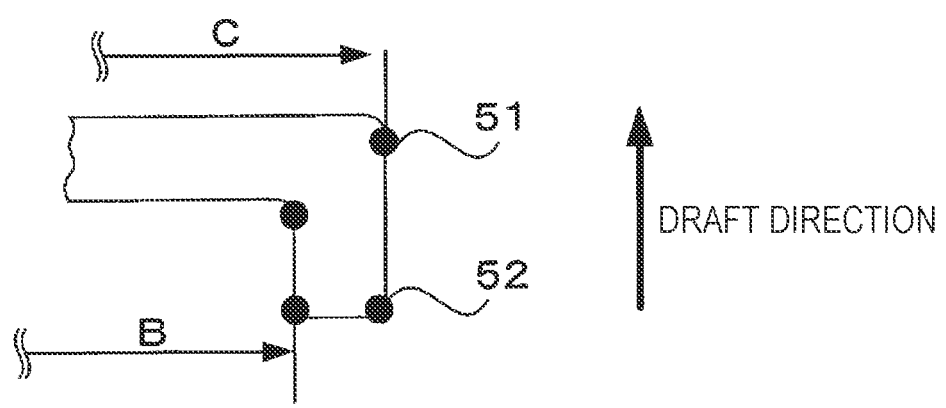
FIG. 5B is an illustration of measurement points when instructions to prohibit draft are given.

The difference in measurement point due to such machining method instructions will be described with reference to FIG. 5, FIG. 6. For example, a measurement point will be described when illustration as indicated in FIG. 5A is provided in a three-dimensional model, and a dimension value denoted as C is to be measured. If instructions to prohibit draft are given for this measurement point, as illustrated in FIG. 5B, at least two points of measurement points 51, 52 at a tip end and a root end in draft direction are needed.

Figure 6A:
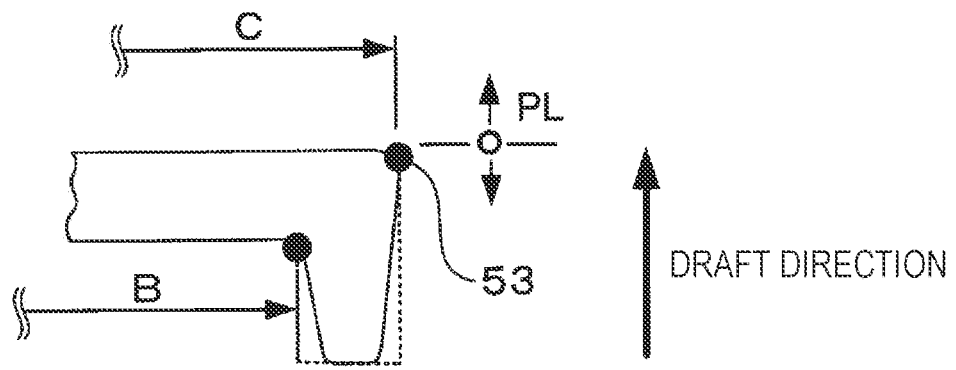
FIG. 6A is a drawing illustrating appropriate measurement points when the position of PL is specified at a point.
Figure 6B:
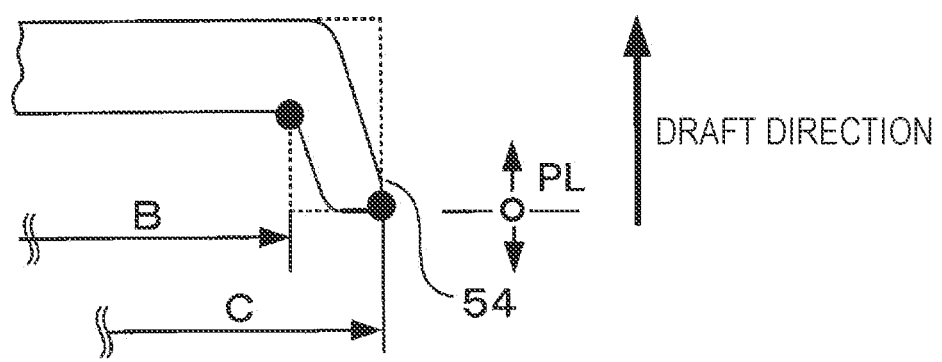
FIG. 6B is a drawing illustrating appropriate measurement points when the position of PL is specified at another point provided that no instructions to prohibit draft are given in both figures.

In contrast, appropriate measurement points when no instructions to prohibit draft are given for this point are illustrated in FIG. 6. When PL is set at the position as illustrated in FIG. 6A, a measurement point 53 at a root end in draft direction needs to be measured. When PL is set at the position as illustrated in FIG. 6B, a measurement point 54 at a root end in draft direction needs to be measured.

The reason why such setting of a measurement point in consideration of draft is needed will be specifically described. For example, when a site with a height of 5 mm and draft of 1 degree is to be measured, the dimension difference as shown below occurs between a tip end and a root end of the draft.

$$\text{Dimension difference} = 5 \text{ (mm)} \times \tan(1°) = 0.087 \text{ (mm)}$$

Specifically, the dimension difference between the tip end and the root end is approximately 0.087 (mm), thus the dimensions at the tip end and the root differ by nearly 0.1 mm. Such a dimension difference is non-negligible depending on the set tolerance, and if a measurement point is erroneously set, a molded product may fail inspection although the product is properly produced.

In the drawing data processing system of the exemplary embodiment, when a molded product is inspected using PMI included in three-dimensional model data, it is possible to appropriately inspect whether inspection target sites are molded in a proper state by setting appropriate measurement points and the number of the measurement points for each of inspection target sites according to the characteristics of the inspection target site.

When a dimension of an inspection target site is measured, various inspection methods may be used, such as measurement with a caliper, measurement with a CMM, measurement with a pin gauge, and measurement with a block gauge. Thus, for the PMI of each of inspection target items, an appropriate inspection method needs to be selected for inspection according to the required accuracy, and the shape of the inspection target site.

However, a user who is not familiar with inspection method may be unable to select an inspection method for each of the inspection target sites. In addition, there is a problem in that a selected inspection method and an inspection result (pass or fail) vary depending on a user who decides an inspection method. Furthermore, there is another problem in that manually deciding an inspection method for each PMI takes time and effort.

To cope with this, in the drawing data processing system of the exemplary embodiment, the control as described below is performed, thus when a molded product is inspected using the PMI included in three-dimensional model data, an inspection method to be used is automatically decided for each PMI as an inspection target item.

Figure 7:
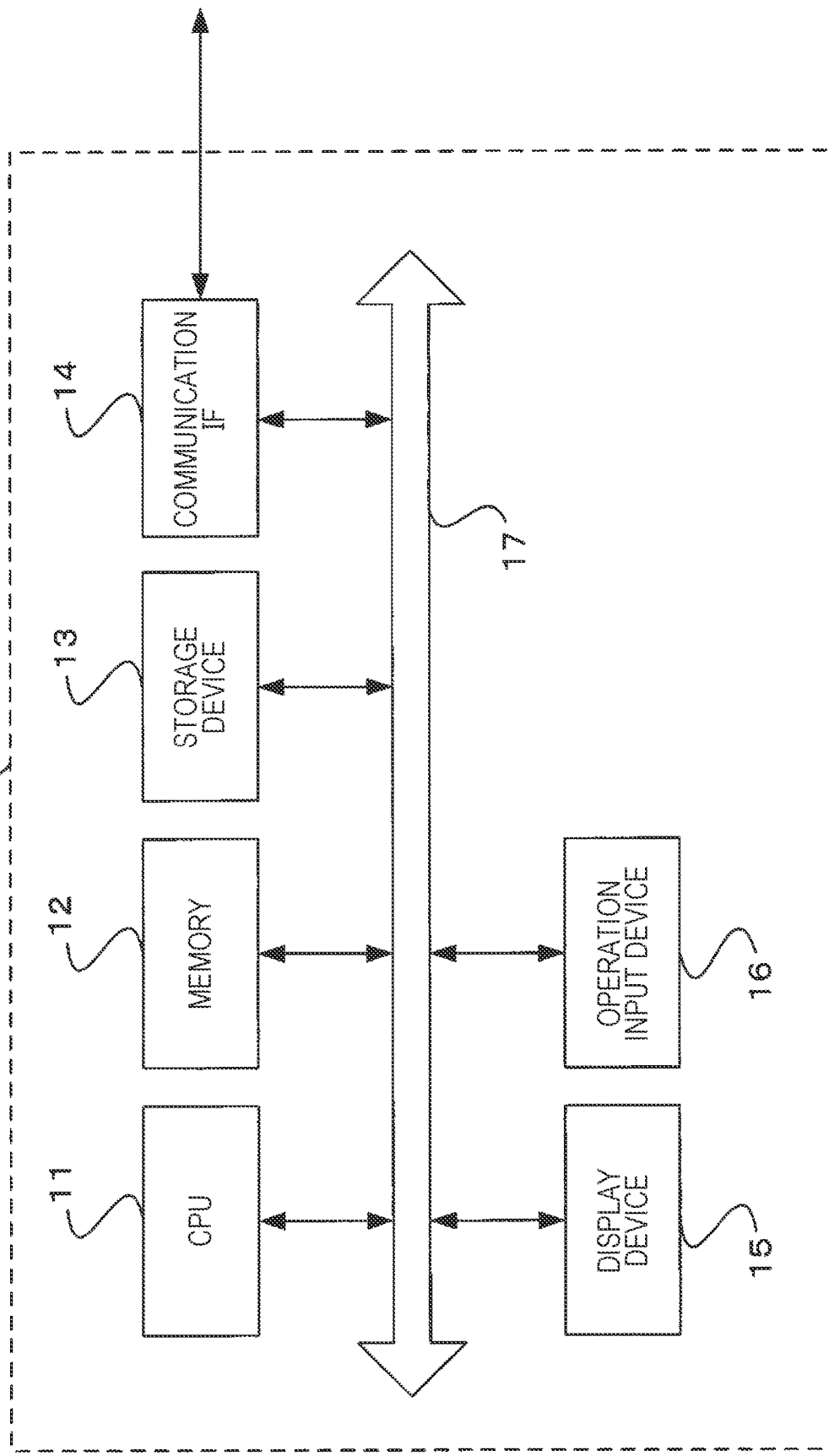
FIG. 7 is a block diagram illustrating a hardware configuration of a terminal apparatus in the exemplary embodiment of the present disclosure.

Next, the hardware configuration of the terminal apparatus 10 of the drawing data processing system in the exemplary embodiment is illustrated in FIG. 7.

As illustrated in FIG. 7, the terminal apparatus 10 includes a CPU 11, a memory 12, a storage device 13 such as a hard disk drive, a communication interface (abbreviated as IF) 14 to transmit and receive data to and from an external apparatus via a network 30, a display device 15 such as a liquid crystal display, and an operation input device 16 including a touch panel or a keyboard. These components are coupled to each other via a control bus 17.

The CPU 11 is a processor that executes a predetermined process based on a control program stored in the memory 12 or the storage device 13, thereby controlling the operation of the terminal apparatus 10. In the exemplary embodiment, the CPU 11 has been described as a processor that reads and executes a control program stored in the memory 12 or the storage device 13. However, without being limited to this, the control program may be provided in a form recorded in a computer-readable recording medium. For example, the control program may be provided in a form recorded in an optical disk such as a compact disc (CD)-ROM and a digital versatile disc (DVD) ROM, or a form recorded in a semiconductor memory such as a universal serial bus (USB) memory and a memory card. Alternatively, the control program may be obtained from an external apparatus via a communication line connected to the communication IF 14.

Figure 8:
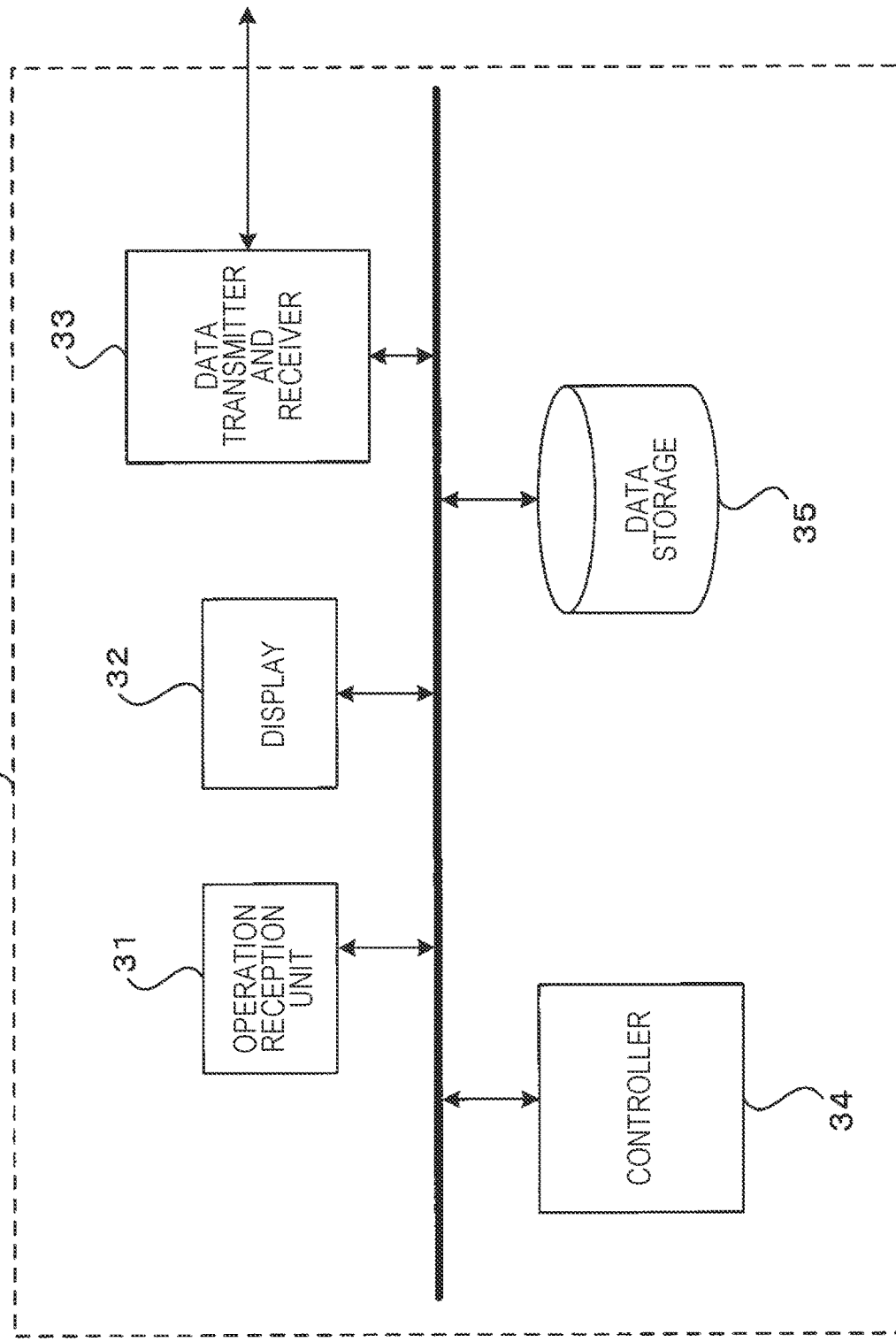
FIG. 8 is a block diagram illustrating a functional configuration of a terminal apparatus in the exemplary embodiment of the present disclosure.

FIG. 8 is a block diagram illustrating the functional configuration of the terminal apparatus 10 implemented by executing the above-described control program.

As illustrated in FIG. 8, the terminal apparatus 10 of the exemplary embodiment includes an operation reception unit 31, a display 32, a data transmitter and receiver 33, a controller 34, and a data storage 35.

The data transmitter and receiver 33 transmits and receives data to and from an external apparatus such as the drawing data management server 20.

The display 32 is controlled by the controller 34, and displays various information for a user. The operation reception unit 31 receives various operations performed by a user.

The controller 34 receives drawing data from the drawing data management server 20 via the data transmitter and receiver 33, stores the drawing data in the data storage 35, and displays the drawing data stored in the data storage 35 on the display 32. The controller 34 extracts information such as a size tolerance, a geometric tolerance in the drawing data as inspection standards based on the drawing data stored in the data storage 35 received in the operation reception unit 31 by a user operation, and generates an inspection table.

First, the controller 34 extracts, as an inspection target item, PMI needed for inspection from three-dimensional model data including PMI which is needed when a molded product is manufactured.

The controller 34 then sets the measurement points to be measured for each measurement target site and the number of the measurement points according to information related to the extracted PMI as an inspection target item.

Specifically, the controller 34 sets the measurement points to be measured for each measurement target site and the number of the measurement points using information on at least one of the type of PMI as an inspection target item, the shape, material, color of an inspection target site, the magnitude of a value of a reference dimension, required accuracy and machining method.

The controller 34 decides an appropriate number of measurement points to determine whether an inspection target site is molded in a proper state as to PMI as one inspection target item.

When PMI which defines a size tolerance is extracted as an inspection target item, the controller 34 sets measurement points and the number of the measurement points using information on instructions in terms of machining method.

In addition, when PMI which defines a geometric tolerance is extracted as an inspection target item, the controller 34 sets, as measurement points, points where a theoretical dimension related to the geometric tolerance is set.

In addition, the controller 34 sets measurement points and the number of the measurement points according to the length or area of the shape/form of an inspection target site.

Specifically, the controller 34 sets a greater number of measurement points for a longer length or a larger area of the shape/form of the inspection target site.

In addition, the controller 34 sets measurement points and the number of the measurement points according to the type of the shape/form of the inspection target site, for example, according to whether the inspection target site is a hole or a surface.

In addition, the controller 34 decides an inspection method to be used for inspection as to the PMI as an inspection target item according to the information related to the PMI extracted from three-dimensional model data. Here, the inspection method indicates what type of a measurement tool, a measurement device, an inspection device or an inspection tool should be used to perform measurement or inspection at set measurement points.

Note that appropriate measurement points and the number of measurement points vary depending on the inspection method, thus after the inspection method is decided, the controller 34 may set measurement points and the number of the measurement points according to the decided inspection method.

Specifically, the controller 34 decides an inspection method to be used for inspection as to PMI as an inspection target item using information on one of or information on a combination of at least two of the type of the PMI, the shape, material, color of an inspection target site, the magnitude of a value of a reference dimension, required accuracy and machining method.

The controller 34 selects a measurement device from multiple measurement devices having different levels of measurement accuracy, the measurement device satisfying requirements required for inspection as to PMI as an inspection target item, and decides an inspection method to be used for inspection as to the extracted PMI, the inspection method using the selected measuring machine.

The controller 34 decides an inspection method to be used for inspection as to PMI as an inspection target item from information related to the PMI based on predetermined decision criteria defined stepwise.

For example, the controller 34 decides an inspection method to be used for inspection as to PMI as an inspection target item stepwise in the order of a first decision criterion, a second decision criterion, and a third decision criterion stepwise, the first decision criterion being the type of the PMI, the second decision criterion being the shape of an inspection target site, the third decision criterion being the magnitude of a value of a reference dimension and the width of a tolerance.

Here, the controller 34 narrows a range of an inspection method to be used for inspection as to PMI in the order of the first decision criterion, the second decision criterion and the third decision criterion, and upon narrowing usable inspection methods to one inspection method, decide the one inspection method as an inspection method to be used for inspection as to the PMI.

Note that the controller 34 may decide an inspection method to be used for inspection as to PMI stepwise using a fourth decision criterion subsequent to the third decision criterion, the fourth decision criterion being measurement efficiency indicating easiness of measurement of a dimension of an inspection target site.

In addition, upon a decision of an inspection method using the fourth decision criterion, the controller 34 may decide that a higher measurement efficiency is achieved for selection of an inspection method with a smaller number of times of switching of an inspection method for continuous inspection of dimensions of different inspection target sites.

Next, the operation of the terminal apparatus 10 in the drawing data processing system of the exemplary embodiment will be described in detail with reference to the drawings.

First, an outline of the operation when an inspection table is automatically generated from three-dimensional model data in the terminal apparatus 10 of the drawing data processing system of the exemplary embodiment will be described with reference to the flowchart of FIG. 9.

In the exemplary embodiment, the case where an inspection table is generated in the terminal apparatus 10 will be described. However, an inspection table may be generated from three-dimensional model data in the drawing data management server 20.

First, in step S101, the controller 34 extracts, as inspection standards, size tolerances and geometric tolerances serving as the inspection target items from three-dimensional model data based on which an inspection table is generated. Next, in step S102, the controller 34 assigns an inspection number to each of the extracted inspection standards.

In step S103, for each of the extracted inspection standards, the controller 34 decides an inspection method capable of measuring or inspecting dimension values in the inspection standard appropriately. A specific example of a specific decision criterion for deciding an inspection method will be described below.

Next, in step S104, for each of the inspection standards extracted from three-dimensional model data, the controller 34 sets measurement points and the number of measurement points which allow dimension values in the inspection standard to be appropriately measured. A specific example of a specific decision criterion when the measurement points and the number of measurement points are set will also be described below.

In step S105, the controller 34 generates one inspection row for one inspection standard extracted from three-dimensional model data. The inspection row indicates a row provided in the inspection table, corresponding to one measurement point or one inspection point. Specifically, the inspection row indicates each row which is provided to be filled with an inspection result for a reference dimension in the inspection table example illustrated in FIG. 3.

Next, for an inspection standard with multiple measurement points set in step S104, the controller 34 expands one inspection row to multiple rows in step S106. For example, when four measurement points are determined to be needed for one inspection standard in step S104, three inspection rows are added for the inspection standard, and totally four rows are provided.

Finally, the controller 34 outputs an inspection table generated in step S107 in a predetermined format.

In the drawing data processing system of the exemplary embodiment, the process in each of step S103, S104, S106 is a characteristic process, thus the details of the process will be primarily described in the following.

Figure 9:
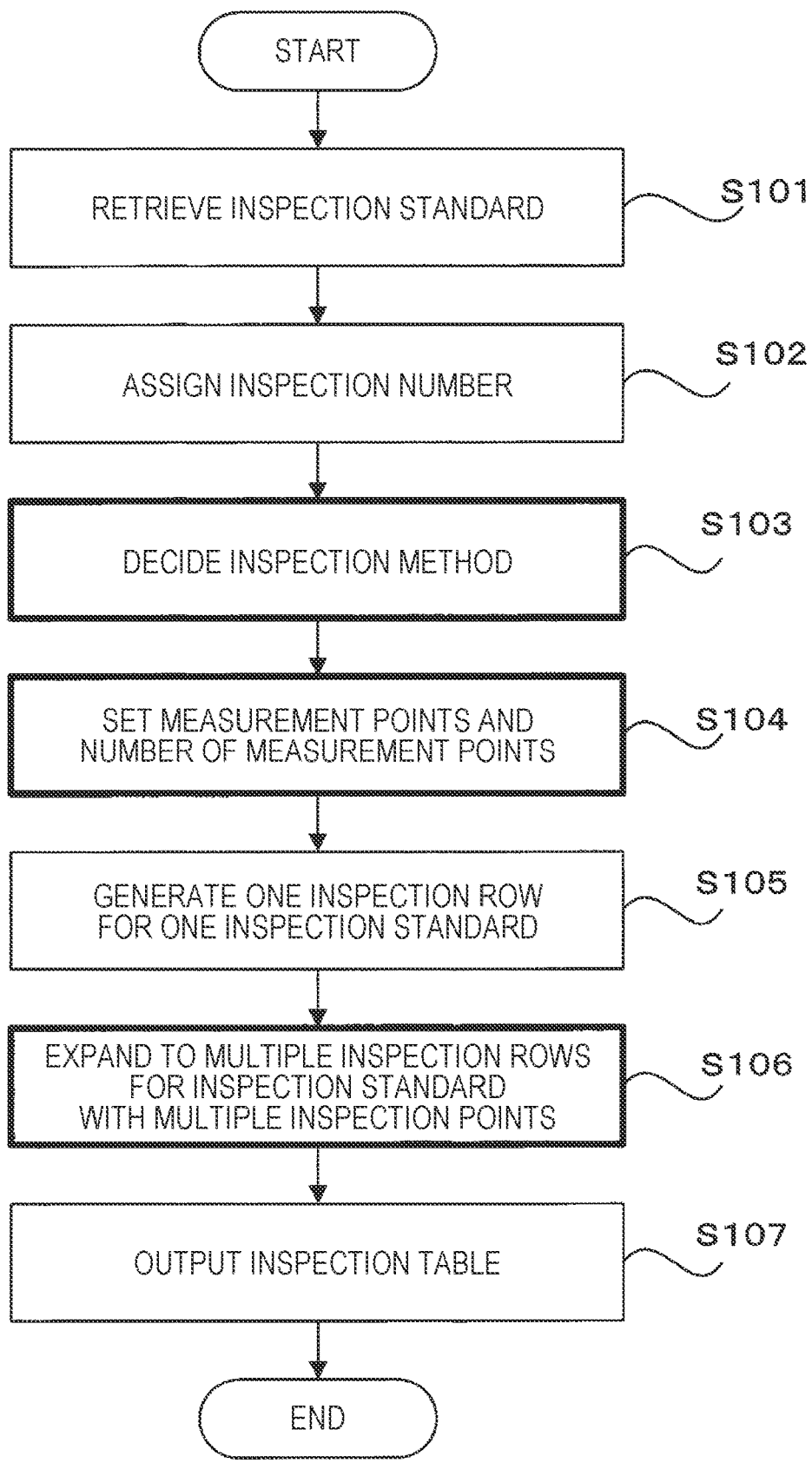
FIG. 9 is a flowchart illustrating an outline of the operation when an inspection table is automatically generated from three-dimensional model data.

First, FIG. 10, FIG. 11. illustrate a decision criteria example for deciding an inspection method, the decision criteria example being described in step S103 of the flowchart of FIG. 9. Note that the decision criteria example illustrated in FIG. 10, FIG. 11 is just an example, which is a citation showing only part of decision criteria.

The process flow for deciding an inspection method is primarily conducted based on the decision criteria as described below.

A: Selection of inspection method based on type of inspection standard.

(1) The process is performed differently depending on whether the type of inspection standard is size tolerance or geometric tolerance.

(2) When the type of inspection standard is size tolerance, the process is performed differently depending on whether the type of inspection standard is length dimension, diameter dimension, angle dimension, chamfering, or screw.

(3) When the type of inspection standard is size tolerance and length dimension, the process is performed differently depending on whether the size tolerance is datum reference value or local dimension which is not datum reference. In the case of datum reference value, measurement with a coordinate measuring machine (abbreviated as CMM) is decided as the inspection method to be used.

(4) When the size tolerance is a local dimension, an inspection method is decided using the shape of a measurement target site, the magnitude of the value of a reference dimension, and the width of a tolerance.

(5) When the type of the inspection standard is geometric tolerance, an inspection method is selected based on the type of geometry tolerance, that is, whether the geometry tolerance is straightness, flatness, or profile. For example, when the type of the geometric tolerance is profile, measurement with a CMM is decided as the inspection method to be used.

B: Selection of inspection method based on the type of inspection standard. (1) First, the process is performed differently depending on whether the shape of a measurement target site is on the outside such as a projecting shape or on the inside such as a hole. Specifically, when the measurement target site is on the outside, an inspection method is selected which uses a measurement tool, such as a micrometer, a caliper, capable of measuring the measurement target site by gripping it.

(2) Even when the measurement target site is on the outside, if the measurement surfaces are not opposed, measurement by gripping the measurement target site is not possible. Specifically, when the measurement surfaces are in the same orientation, or one of the measurement surfaces is tilted relative to the other measurement surface, measurement by gripping the measurement target site is not possible. Furthermore, even when the measurement surfaces are opposed and measurement by gripping the measurement target site is possible, if the reference dimension exceeds, for example, 100 mm, it is determined that measurement with a micrometer is not appropriate, and another inspection method is selected.

C: Selection of inspection method based on reference dimension and tolerance (1) Each of measurement tools and measurement devices has a measurement range where measurement is possible. For this reason, an inspection method is selected based on the decision criterion whether the reference dimension is within the measurable range of a measurement tool or a measurement device. An inspection method is selected also using a decision criterion whether various gauges such as a block gauge and probes for measurement are insertable in the measurement target site.

(2) In addition, a measurable dimensional accuracy is set in each measurement tool and measurement device. Thus, use of a measurement tool having lower measurement accuracy may be unsuitable for measurement of a dimension value with a small tolerance. Therefore, an inspection method is decided which uses an appropriate measurement tool according to the width of a tolerance. For example, the descending order of measurement accuracy of the measurement tools is given by pin gauge>micrometer>caliper, and when the tolerance is small, an inspection method is selected which uses a measurement tool having higher measurement accuracy.

In this manner, the controller 34 decides an inspection method to be used for inspection as to PMI as an inspection target item from information related to the PMI based on the decision criteria defined stepwise as illustrated in FIG. 10, FIG. 11. In other words, the controller 34 is configured to be able to decide an inspection method to be used by applying the decision criteria as illustrated in FIG. 10, FIG. 11 sequentially from the left to the right.

Figure 12:
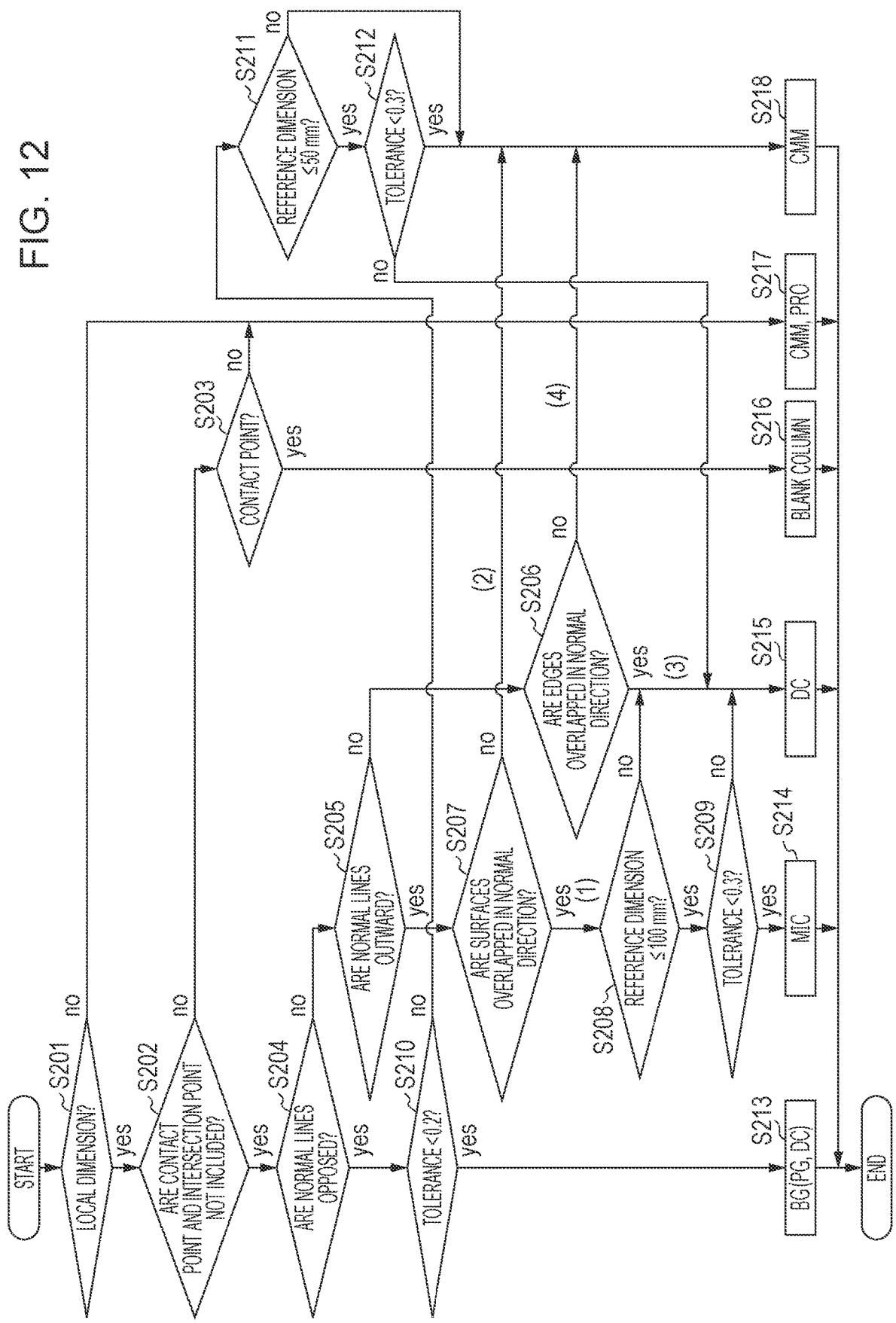
FIG. 12 is a flowchart illustrating part of the process when an inspection method is decided using the decision criteria illustrated in FIG. 10, FIG. 11.

Part of the process to decide an inspection method using the decision criteria illustrated in FIG. 10, FIG. 11 will be described with reference to the flowchart of FIG. 12. The flowchart of FIG. 12 shows a determination example when the type of an inspection standard is size tolerance and length dimension.

First, in step S201, the controller 34 determines whether the type of the inspection standard is local dimension. When it is determined in step S201 that the type of the inspection standard is not local dimension, in other words, when it is determined that the type of the inspection standard is datum reference dimension, in step S217, the controller 34 selects an inspection method with a CMM (abbreviation of coordinate measuring machine), a PRO (abbreviation of profile projector) as the inspection method.

When it is determined in step S201 that the type of the inspection standard is local dimension, in step S202, the controller 34 determines whether the inspection standard includes none of a contact point and an intersection point. When it is determined in step S202 that the inspection standard includes one of a contact point and an intersection point, in step S203, the controller 34 determines whether the inspection standard includes a contact point.

When it is determined in step S203 that the inspection standard includes no contact point, in other words, the inspection standard includes an intersection point, in step S217, the controller 34 selects an inspection method with a CMM, PRO as the inspection method. When it is determined in step S203 that the inspection standard includes a contact point, in step S216, the controller 34 leaves the column for an inspection method for the inspection standard as blank. This is because there are various inspection methods for a contact point, and it is difficult to uniquely decide an inspection method, thus determination is left to the inspector by leaving the column as blank.

When it is determined in step S202 that the inspection standard includes none of a contact point and an intersection point, in step S204, the controller 34 determines whether the normal lines of two inspection target surfaces are opposed.

Figure 13:
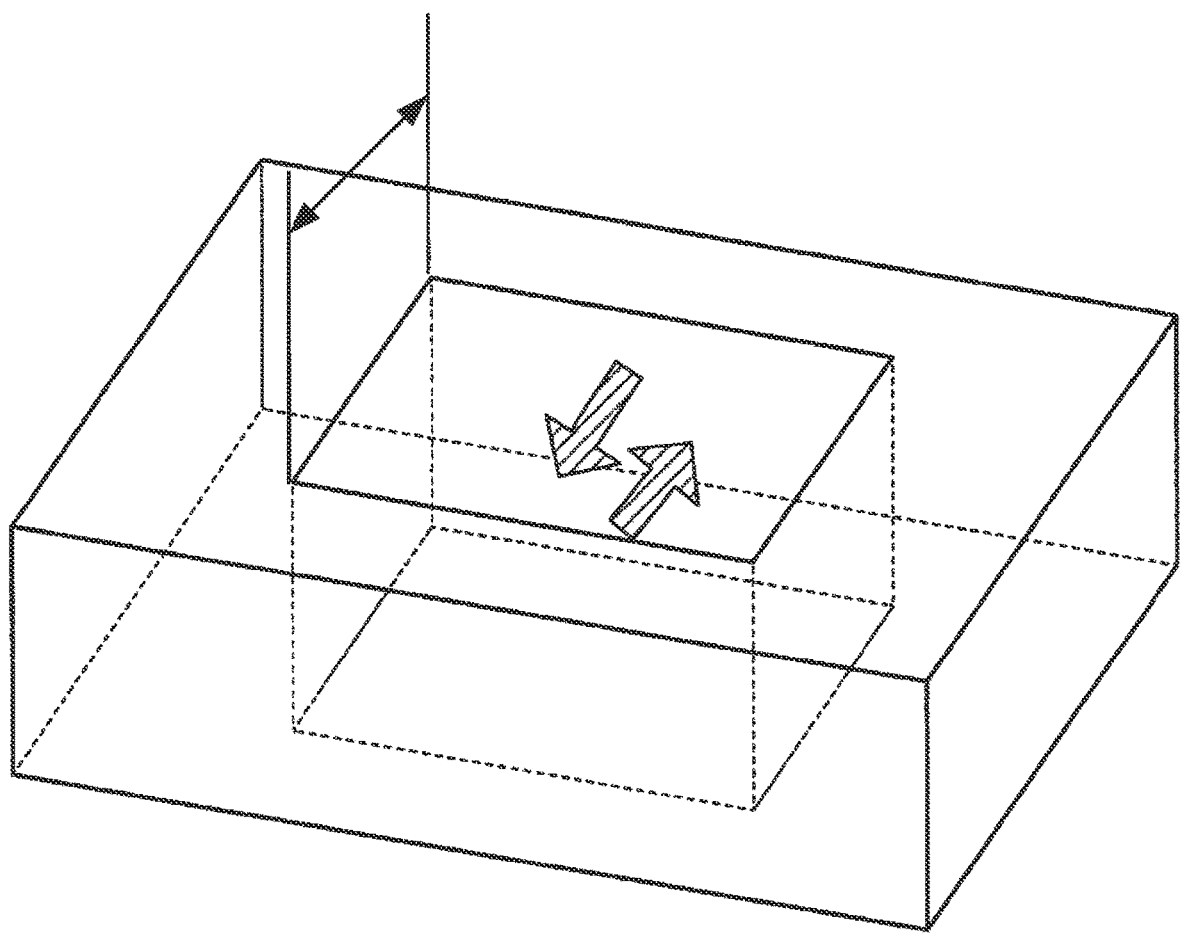
FIG. 13 is a drawing illustrating the manner in which the normal lines of two inspection target surfaces are opposed.

FIG. 13 illustrates the manner in which the normal lines of two inspection target surfaces are opposed. As illustrated in FIG. 13, the opposed normal lines of two inspection target surfaces indicate that the two inspection target surfaces are parallel, and the shape of the inspection target site is a hole.

When it is determined in step S204 that the normal lines of two inspection target surfaces are opposed, in other words, when it is determined that the shape of the inspection target site is a hole, in step S210, the controller 34 determines whether the tolerance is less than 0.2 mm.

When it is determined in step S210 that the tolerance is less than 0.2 mm, in step S213, the controller 34 selects an inspection method with a BG (abbreviation of block gauge) Note that when the dimension of the hole of an inspection target site does not allow a BG to be inserted, the controller 34 selects an inspection method with a PG (abbreviation of pin gauge). In addition, when the dimension of the hole of an inspection target site does not allow a PG to be inserted, the controller 34 selects an inspection method with a DC (abbreviation of digital caliper).

When it is determined in step S210 that the tolerance is 0.2 mm or greater, in step S211, the controller 34 determines whether the reference dimension is 50 mm or less.

When it is determined in step S211 that the reference dimension is greater than 50 mm, in step S218, the controller 34 selects an inspection method with a CMM as the inspection method.

When it is determined in step S211 that the reference dimension is 50 mm or less, in step S212, the controller 34 determines whether the tolerance is less than 0.3 mm.

When it is determined in step S212 that the tolerance is less than 0.3 mm, in step S218, the controller 34 selects an inspection method with a CMM as the inspection method.

When it is determined in step S212 that the tolerance is 0.3 mm or greater, in step S215, the controller 34 selects an inspection method with a DC as the inspection method.

Figure 14:
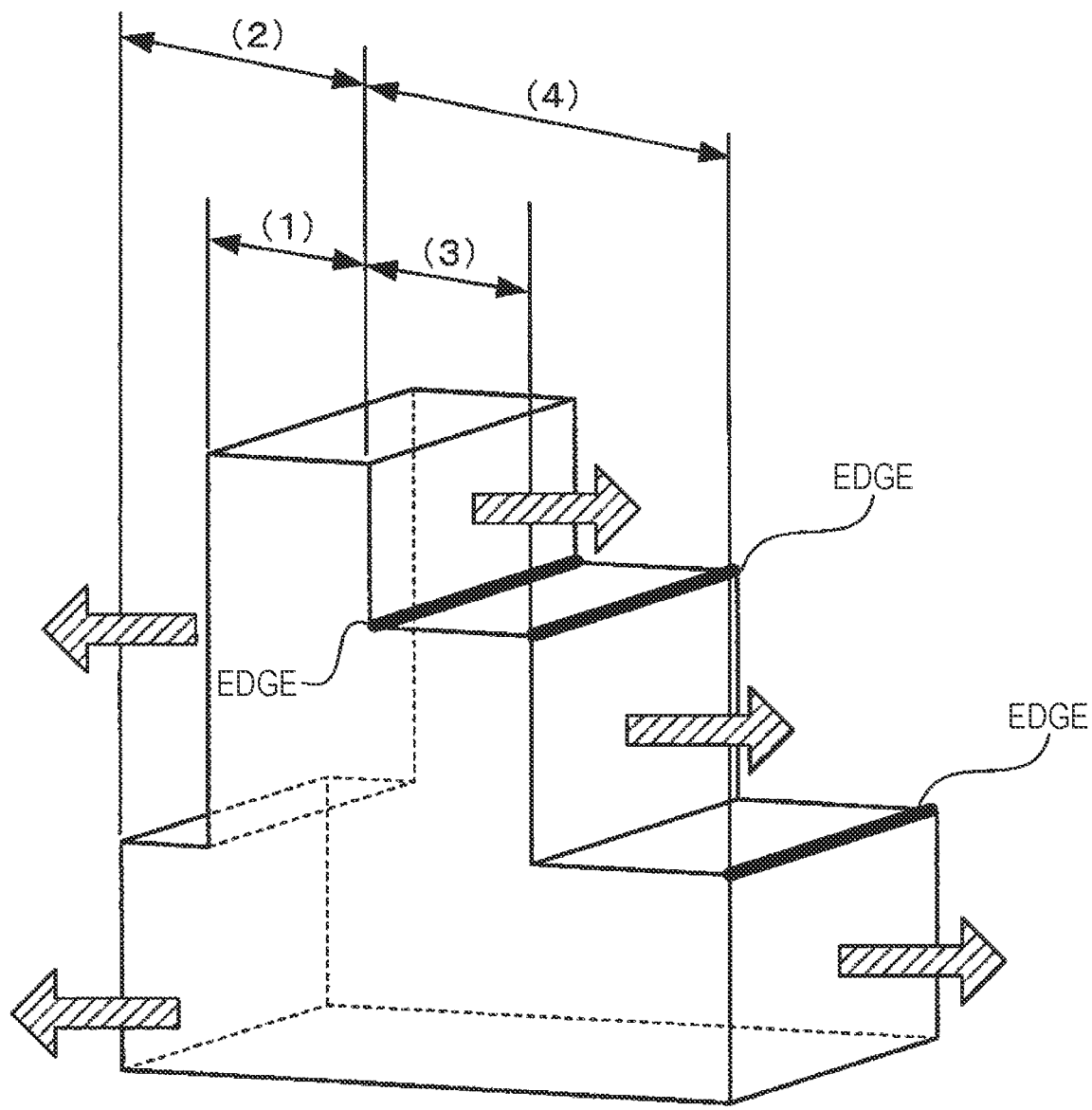
FIG. 14 is a drawing illustrating a specific example when an inspection target site has an outer shape.

When it is determined in step S204 that the normal lines of two inspection target surfaces are not opposed, in other words, when it is determined that the inspection target site has an outer shape, in step S205, the controller 34 determines whether the normal lines of two inspection target surfaces are outward. A specific example where the inspection target site has an outer shape is illustrated in FIG. 14.

When it is determined in step S205 that the normal lines of two inspection target surfaces are outward, in step S207, the controller 34 determines whether the other surface overlaps with the opposite side of the normal line of one surface. In other words, the controller 34 determines in step S207 whether two inspection target surfaces are aligned.

When it is determined in step S207 that the other surface overlaps with the opposite side of the normal line of one surface, in other words, when it is determined that two inspection target surfaces are aligned, in step S208, the controller 34 determines whether the reference dimension is 100 mm or less.

When it is determined in step S208 that the reference dimension is 100 mm or less, in step S209, the controller 34 determines whether the tolerance is less than 0.3 mm.

When it is determined in step S209 that the tolerance is less than 0.3 mm, in step S214, the controller 34 selects an inspection method with a MIC (abbreviation of micrometer) as the inspection method.

When it is determined in step S208 that the reference dimension is not 100 mm or less, and when it is determined in step S209 that the tolerance is not less than 0.3 mm, in step S215, the controller 34 selects an inspection method with a DC.

When it is determined in step S205 that the normal lines of two inspection target surfaces are not outward, in step S206, the controller 34 determines whether the edges of two inspection target surfaces overlap in the normal line direction.

When it is determined in step S206 that the edges of two inspection target surfaces overlap in the normal line direction, in step S215, the controller 34 selects an inspection method with a DC as the inspection method.

When it is determined in step S206 that the edges of two inspection target surfaces do not overlap in the normal line direction, in step S218, the controller 34 selects an inspection method with a CMM as the inspection method.

Note that in the decision criteria example illustrated in FIG. 10, the flowchart illustrated in FIG. 12, and a specific example in which the inspection target site has an outer shape illustrated in FIG. 14, there is a corresponding one of the decision criteria (1) to (4).

Figure 15:
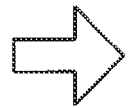
FIG. 15 is a table illustrating the manner in which the columns of inspection method in the inspection table are filled by automatically deciding an inspection method for each inspection standard.

Finally, FIG. 15 illustrates the manner in which the columns of inspection method in the inspection table are filled by automatically deciding an inspection method in this way for each inspection standard by the controller 34. Referring to FIG. 15, it is seen that an inspection method for each inspection standard in the inspection table is decided without a necessity of a manual operation.

Note that when deciding an inspection method, the controller 34 may decide an inspection method to be used not only based on the characteristics of an inspection target site, such as the shape, reference dimension value, and tolerance of an inspection target item, but also based on the measurement efficiency indicating easiness of measurement when the dimension of the inspection target site is actually measured.

It takes time for a measurer to change an in-hand measurement tool or measurement device. Thus, for example, when an inspection method is decided based on a criterion other than the measurement efficiency as mentioned above, even when it is determined that inspection should be made in the order CMM→caliper→CMM, the measurement efficiency is improved by continuously making inspection with the same measurement device in the order CMM→CMM→CMM. Thus, when deciding an inspection method using the decision criterion based on the measurement efficiency, the controller 34 determines that a higher measurement efficiency is achieved for selection of an inspection method with a smaller number of times of switching of an inspection method for continuous inspection of dimensions of different inspection target sites.

The controller 34 may decide an inspection method to be used based on decision criteria as to how interference between a measurement tool and peripheral forms should be avoided when the dimension of a measurement target site is measured, and which measurement tool should be used to measure the dimension of a measurement target site without a necessity of cutting a component.

Figure 16:
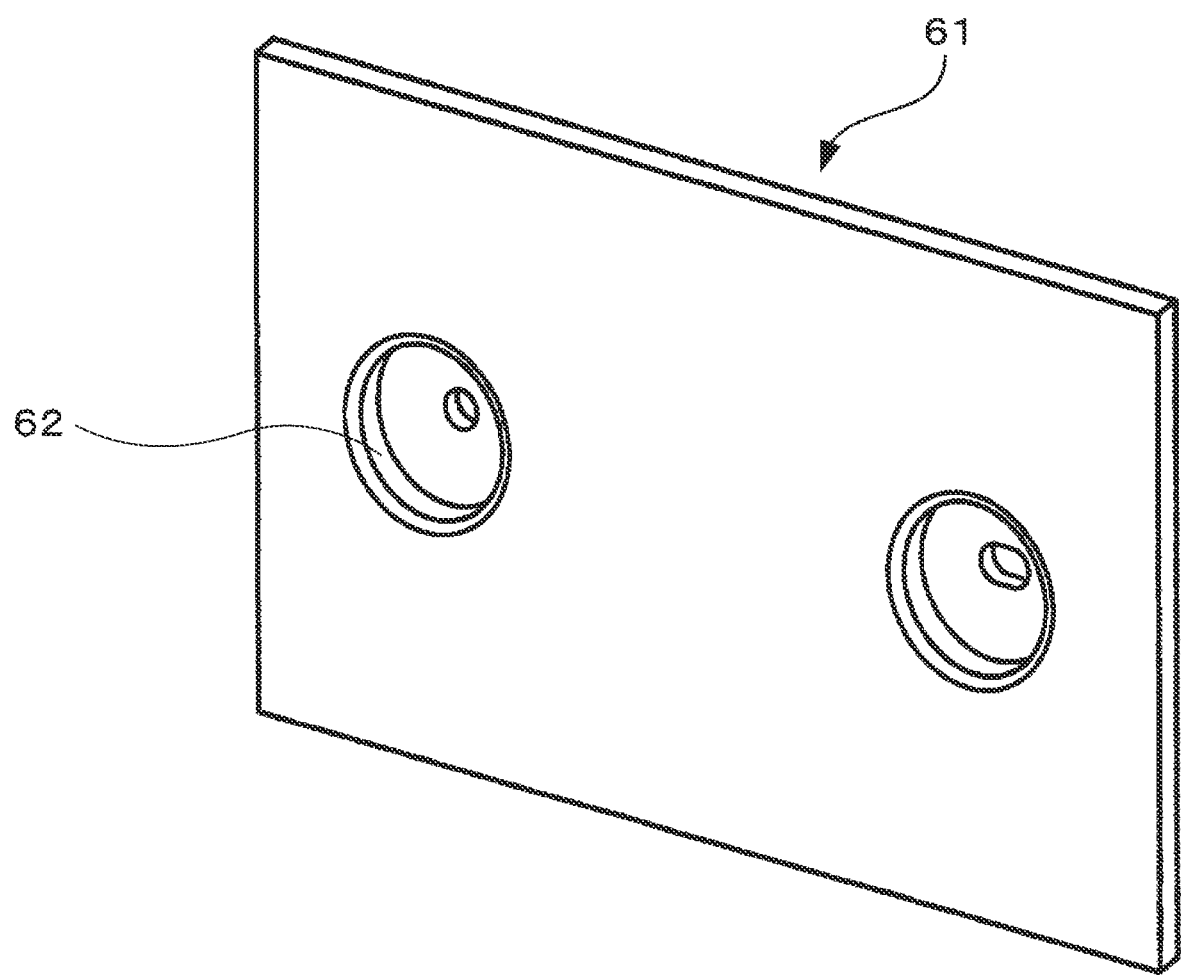
FIG. 16 is a drawing illustrating a component 61 with a shape having recessed portions 62.

Specifically, a description will be given using the case where the dimension of a recessed portion 62 of a component 61 having a certain shape as illustrated in FIG. 16 is measured. It is assumed that in the component 61, the size tolerance of 2±0.3 is specified for the plate thickness in the circular recessed portion 62 as illustrated in FIG. 17. When a size tolerance is attempted to be measured, the inspection method selected based on the decision criteria as described above is assumed to be an inspection method with a caliper.

However, when the dimension of a site is attempted to be measured with a caliper, the site to be measured have to be gripped by the jaws of the caliper. Thus, when the dimension of the plate thickness of the recessed portion 62 is attempted to be measured with a caliper, the jaws of the caliper interfere with the portion of the component 61, other than the recessed portion 62, and the caliper jaws cannot be brought into contact with the site to be measured. As a consequence, when the plate thickness of the recessed portion 62 of the component 61 is attempted to be measured, the component 61 needs to be cut along section line E-E, and measured.

Meanwhile, with a micrometer having higher accuracy than a caliper, measurement is made by gripping a measurement target site in the same manner as with a caliper; however, the micrometer is so-called C-character shaped, thus measurement can be made without interfering with the peripheral forms. Thus, with a micrometer, the plate thickness of the recessed portion 62 can be measured without interference with the portion of the component 61, other than the recessed portion 62, thus the plate thickness of the recessed portion 62 can be measured without cutting the component 61.

Alternatively, with selection of an inspection method using a CMM as the inspection method, the plate thickness of the recessed portion 62 can be determined by measuring the positions of two surfaces, thus the dimension can be measured without cutting the component 61. Like this, when the form of an inspection target site and its peripheral forms interfere with a measurement tool or a measurement device, and yet measurement can be made without interference by using the measurement tool or measurement device having higher accuracy, selection of an inspection method with improved measurement efficiency is made possible by selecting an inspection method using a measurement tool or a measurement device causing no interference.

Next, FIG. 18 illustrates an example of setting criteria when measurement points and the number of measurement points are set as described in step S104 of the flowchart of FIG. 9. Note that the setting criteria example illustrated in FIG. 18 is just an example, which is a citation showing only part of setting criteria.

The controller 34 determines the setting criteria illustrated in FIG. 18 stepwise in the order the type, shape/form, machining method of the standard, and finally sets the number of measurement points and the measurement points based on the conditions such as a reference dimension as an inspection target item.

For example, in the setting criteria example illustrated in FIG. 18, when the type of the inspection standard is "size tolerance", "length dimension", "datum reference", and the machining method is "injection molding" and "draft angle prohibited", the controller 34 sets at least two measurement points. In addition, the controller 34 changes the measurement points according to the length perpendicular to draft direction/length dimension direction. When the draft direction and the length dimension direction are the same direction, the controller 34 does not expand the rows for the draft direction, and sets the number of setting points for each of two perpendicular directions by the decision criteria as described above. In addition, when position is also included, the controller 34 also adds the number of setting points for position concurrently.

In the setting criteria example illustrated in FIG. 18, when the type of the inspection standard is "size tolerance", "length dimension", "datum reference", and the machining method is "injection molding" and "draft angle is a predetermined angle or less", the controller 34 changes the measurement points according to the length perpendicular to the draft direction/length dimension direction. When the draft direction and the length dimension direction are the same direction, the controller 34 sets the number of setting points for each of two perpendicular directions by the decision criteria as described above. In addition, when the measurement target surface is a circle, and the diameter of the circle is 5 mm or greater, the controller 34 sets measurement points for every 90 degrees of the circle. Thus, the controller 34 expands one inspection row to four rows in the inspection table. In addition, when position is also included, the controller 34 also adds the number of setting points for position concurrently.

The process flow for setting measurement points and the number of the measurement points is primarily conducted based on the decision criteria as described below.

(1) When the shape of inspection target points is wide and long, the number of measurement points is increased. For example, when the shape of inspection target points is surface or cylindrical surface, the number of measurement points is changed as described below based on the length or arc length of a reference value as an inspection target item.

When the length is 100 mm or less, the number of measurement points remains one.

When the length is greater than 100 mm and 300 mm or less, the number of measurement points is set to two (that is, one inspection row is added to have totally two rows).

When the length is greater than 300 mm and 500 mm or less, the number of measurement points is set to three (that is, two inspection rows are added to have totally three rows).

When the length is greater than 500 mm, the measurement points are increased by one point per 200 mm (that is, the inspection rows become totally four rows or greater).

Figure 19:
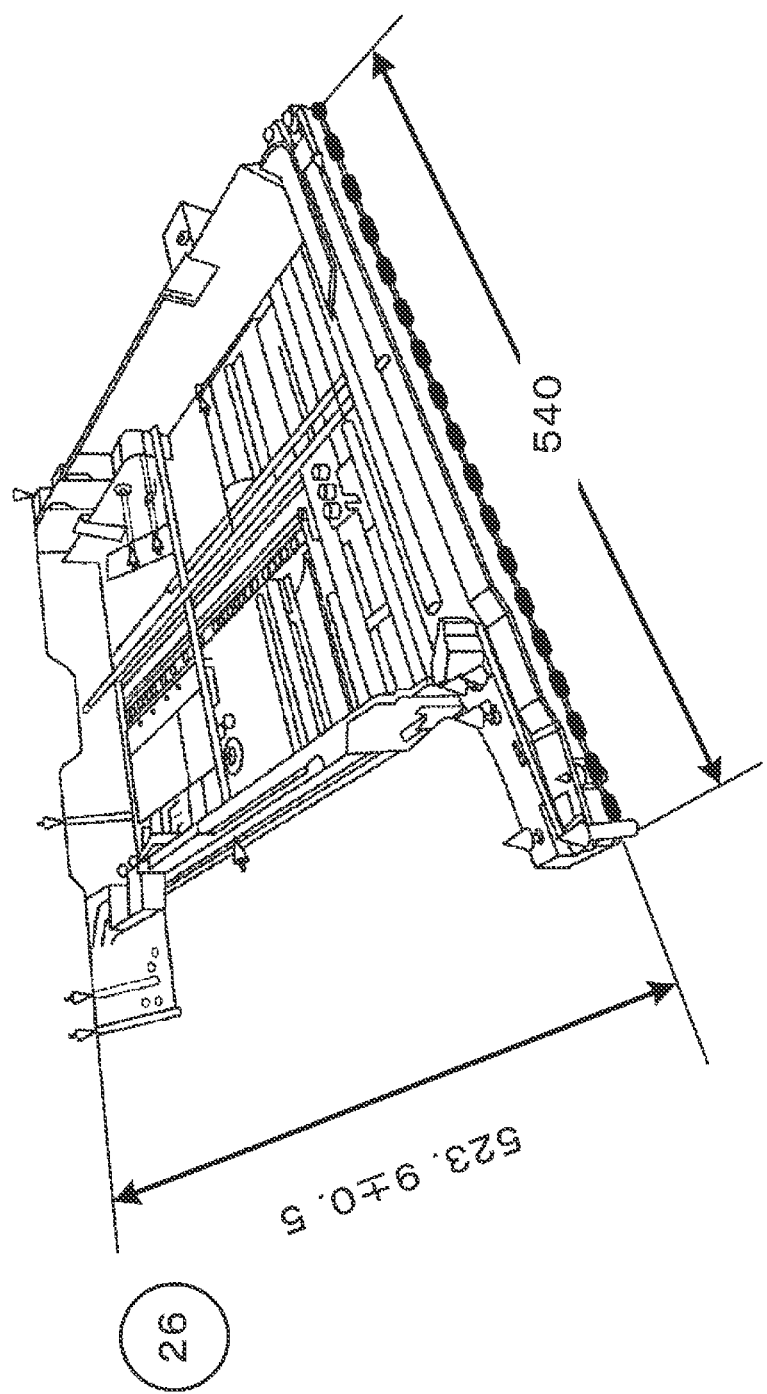
FIG. 19 is a drawing illustrating an example of three-dimensional model data when the number of measurement points is set based on the magnitude of a reference value of a target inspection item.

FIG. 19 illustrates an example when the number of measurement points is set in this manner based on the magnitude of a reference value as a target inspection item.

In the example illustrated in FIG. 19, the reference value as an inspection target item, indicated by inspection number 26 is "523.9±0.5", and the length in a direction perpendicular to the length as an inspection target item, indicated by a thick dotted line in FIG. 19 is 540 mm, which exceeds 500 mm.

Figure 20:
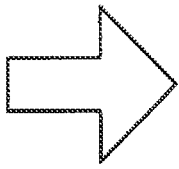
FIG. 20 is a table illustrating the manner in which three rows are added to one row to expand to totally four rows in the inspection table when the number of measurement points is set based on the magnitude of a reference value of each inspection target item.

Thus, as illustrated in FIG. 20, the controller 34 sets the number of measurement points to four, and adds three rows to one row to expand to totally four rows in the inspection table.

(2) When the shape of inspection target points is circle, basically four points on the right, left, up, down are set as the standard. In this case, for example, only when the reference dimension is 5 mm or greater, the measurement points may be set to four points, and when the reference dimension is less than 5 mm, the number of measurement points may remain one.

Figure 21:
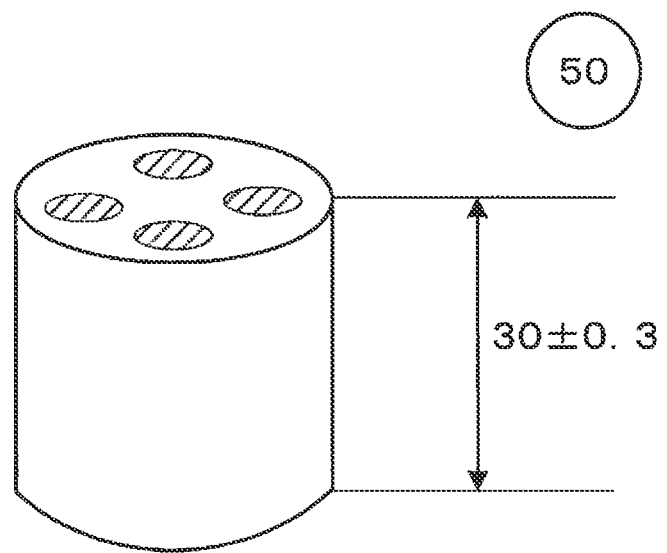
FIG. 21 is a drawing illustrating an example of three-dimensional model data when the number of measurement points is set provided that an inspection target site has a circular shape.

FIG. 21 illustrates an example when the number of measurement points is set provided that an inspection target site has a circular shape.

Figure 22:
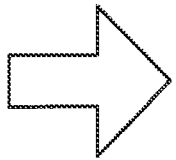
FIG. 22 is a table illustrating the manner in which three rows are added to one row to expand to totally four rows in the inspection table provided that an inspection target site has a circular shape.

In the example illustrated in FIG. 21, the shape of the measurement points as an inspection target indicated by inspection number 50 is circle, thus the controller 34 determines that the number of appropriate measurement points is four, and adds three rows to one row to expand to totally four rows in the inspection table as illustrated in FIG. 22.

(3) When the shape of inspection target points is a projecting shape like a comb teeth shape, inspection rows are added so that the number of measurement points corresponds to the number of projections.

(4) The number of measurement points is changed according to the ratio of the tolerance to the reference dimension.

For example, when the ratio of the size tolerance to the reference dimension is less than or equal to the ratio of ±0.1 mm to 100 mm, the controller 34 doubles the number of rows to be added to the original inspection row.

(5) Measurement points and the number of measurement points are changed according to the case of draft angle prohibited and the case of draft angle with less than or equal to a predetermined angle.

Figure 23:
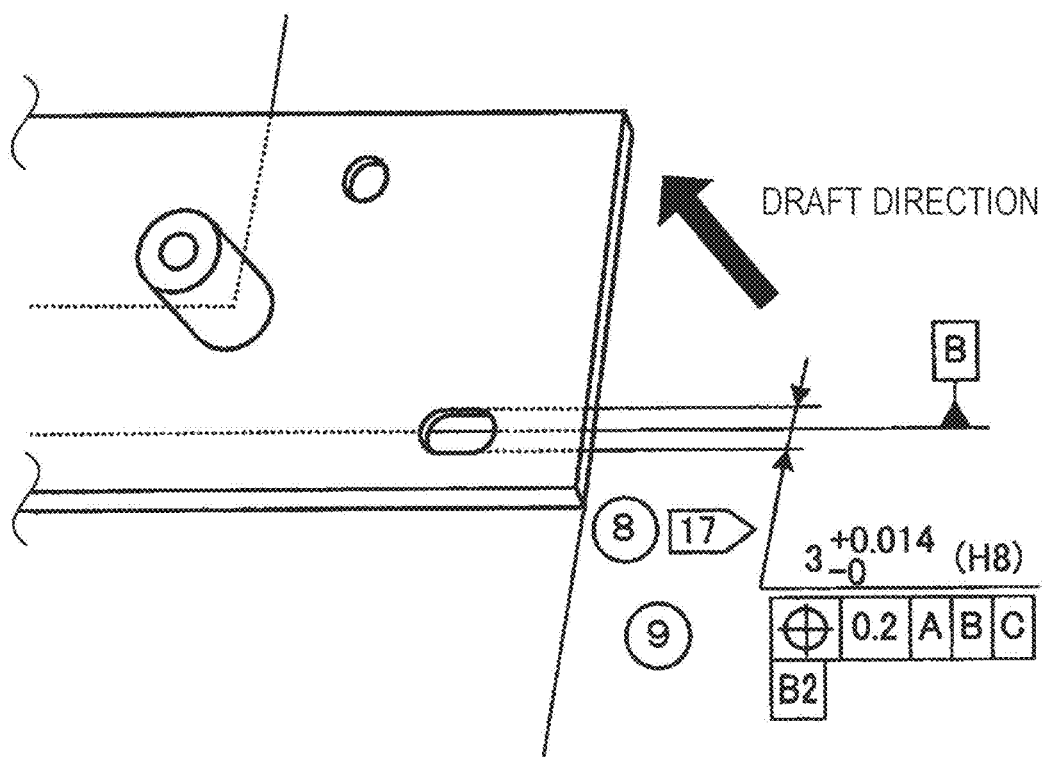
FIG. 23 is a drawing illustrating an example of three-dimensional model data when measurement points and the number of measurement points are set based on instructions to prohibit draft.

FIG. 23 illustrates an example when measurement points and the number of measurement points are set based on whether or not instructions to prohibit draft are given.

In the example illustrated in FIG. 23, the reference dimension indicated by inspection number 8 is "3+0.014−0", injection molding is specified as the machining condition, and instructions to prohibit draft are given by a flag (=the number surrounded by a pentagon) 17.

Figure 24:
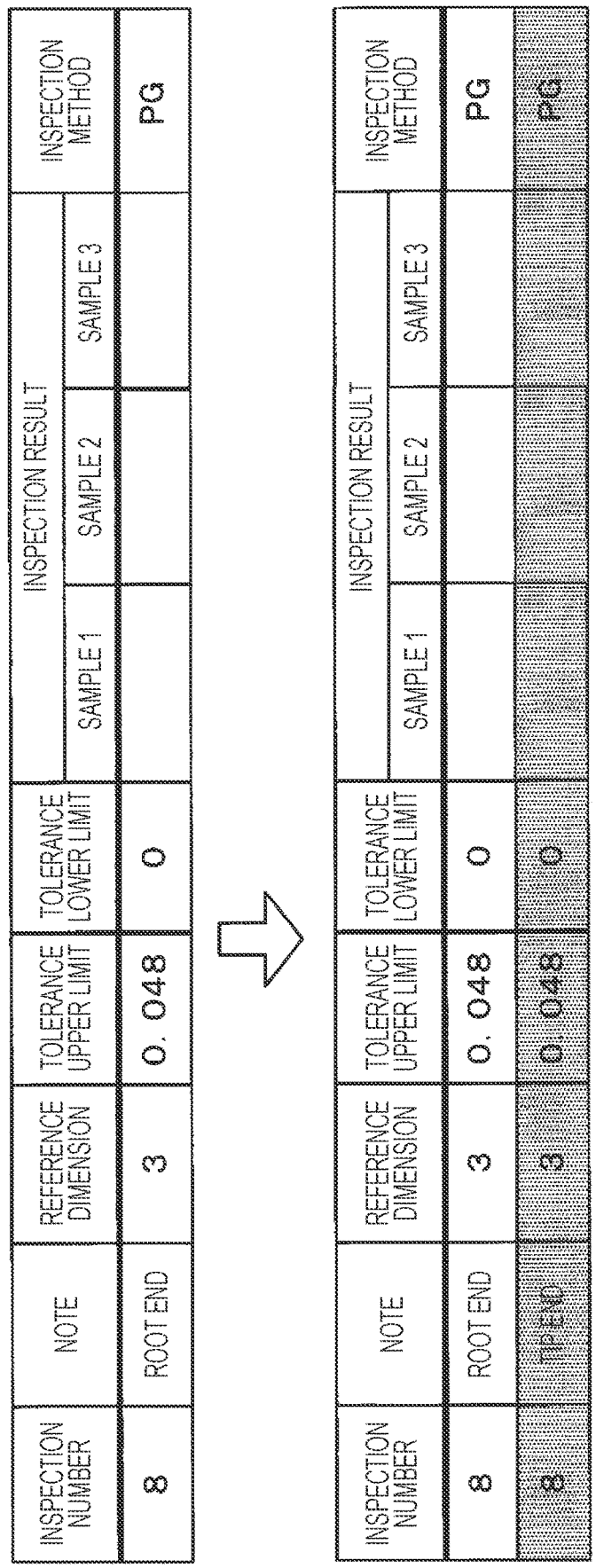
FIG. 24 is a table illustrating the manner in which one row is further added to a row to expand to totally two rows in the inspection table when measurement points and the number of measurement points are set based on instructions to prohibit draft.

Thus, the controller 34 refers to the setting reference example illustrated in FIG. 18. The type of the inspection standard is "size tolerance", "length dimension", "local dimension", the machining method is "injection molding" and "draft angle prohibited", and the length (not illustrated) perpendicular to the draft direction/length direction is 4 mm which is less than 30 mm, thus M=1, and the controller 34 determines that the number of appropriate measurement points is two: one at the root end and the other is at the tip end. As a result, as illustrated in FIG. 24, the controller 34 further adds one row to the inspection row in the inspection table to expand to totally two rows.

(6) One theoretical dimension serving as original decision data for geometric tolerance such as profile is expanded to rows as multiple measurement items. However, the rows themselves to be added are not individually decided, and regarded as a reference value.

(7) The number of measurement points is changed for a different measurement method. For example, when the measurement method for a cylindrical hole is a measurement method using a pin gauge, the measurement point is set at one point. However, when the measurement method uses a micrometer or a caliper, at least two measurement points are set vertically or horizontally.

The controller 34 sets appropriate measurement points and the number of measurement point according to the characteristics of an inspection target site based on various setting criteria as described above.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
extract product manufacturing information needed for inspection from three-dimensional model data that is used when a molded product is manufactured, the product manufacturing information being a three-dimensional model that is constructed based on the three-dimensional model data with an annotation displayed over the three-dimensional model; and
determine an inspection method to be used for inspection of an inspection target item in the extracted product manufacturing information, according to information related to the extracted product manufacturing information.

2. The information processing apparatus according to claim 1,
wherein the processor is configured to determine the inspection method to be used for inspection of the inspection target item, from information related to the extracted product manufacturing information based on predetermined decision criteria defined stepwise.

3. The information processing apparatus according to claim 2,
wherein the processor is configured to determine the inspection method to be used for inspection of the inspection target item based on information on one or a combination of at least two of: a type of the product manufacturing information, a shape, a material, a color of an inspection target site, a magnitude of a value of a reference dimension, a required accuracy and a machining method.

4. The information processing apparatus according to claim 3,
wherein the processor is configured to:
select a measuring machine from a plurality of measuring machines having different levels of measurement accuracy, the measuring machine satisfying requirements that are required for inspection of the inspection target item; and
determine the inspection method to be a method using the selected measuring machine.

5. The information processing apparatus according to claim 1,
wherein the processor is configured to determine the inspection method to be used for inspection of the inspection target item in a stepwise order of a first decision criterion, a second decision criterion and a third decision criterion, the first decision criterion being a type of the product manufacturing information, the second decision criterion being a shape of an inspection target site, the third decision criterion being a magnitude of a value of a reference dimension and a width of a tolerance range.

6. The information processing apparatus according to claim 5,
wherein the processor is configured to narrow a range of an inspection method to be used for inspection in an order of the first decision criterion, the second decision criterion and the third decision criterion, and upon narrowing usable inspection methods to one inspection method, determine the one inspection method as an inspection method to be used for inspection.

7. The information processing apparatus according to claim 5,
wherein the processor is configured determine the inspection method to be used for inspection stepwise using a fourth decision criterion subsequent to the third decision criterion, the fourth decision criterion being measurement efficiency indicating easiness of measurement of a dimension of an inspection target site.

8. The information processing apparatus according to claim 7,
wherein the processor is configured to, upon determining the inspection method using the fourth decision criterion, determine that a higher measurement efficiency is achieved for an inspection method that would result in a smaller number of times of switching of an inspection method for continuous inspection of dimensions of different inspection target sites in the extracted product manufacturing information.

9. The information processing apparatus according to claim 1, wherein
the processor identifies a plurality of inspection target items from the extracted product manufacturing information and determines a plurality of corresponding inspection methods to be used for inspection of the respective inspection target items, without requiring a manual input.

10. A non-transitory computer readable medium storing a program causing a computer to execute a process comprising:

extracting product manufacturing information needed for inspection from three-dimensional model data that is used when a molded product is manufactured, the product manufacturing information being a three-dimensional model that is constructed based on the three-dimensional model data with an annotation displayed over the three-dimensional model; and determining an inspection method to be used for inspection of an inspection target item in the extracted product manufacturing information according to information related to the extracted product manufacturing information.

11. An information processing method comprising:

extracting product manufacturing information needed for inspection from three-dimensional model data that is used when a molded product is manufactured, the product manufacturing information being a three-dimensional model that is constructed based on the three-dimensional model data with an annotation displayed over the three-dimensional model; and determining an inspection method to be used for inspection of an inspection target item in the extracted product manufacturing information according to information related to the extracted product manufacturing information.

* * * * *